US009305392B2

(12) United States Patent
Luebke et al.

(10) Patent No.: US 9,305,392 B2
(45) Date of Patent: Apr. 5, 2016

(54) FINE-GRAINED PARALLEL TRAVERSAL FOR RAY TRACING

(71) Applicant: NVIDIA Corporation, Santa Clara, CA (US)

(72) Inventors: David Luebke, Charlottesville, VA (US); Timo Aila, Tuusula (FI); Jacopo Pantaleoni, Berlin (DE); David Tarjan, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 382 days.

(21) Appl. No.: 13/714,284

(22) Filed: Dec. 13, 2012

(65) Prior Publication Data
US 2014/0168238 A1 Jun. 19, 2014

(51) Int. Cl.
*G06T 15/00* (2011.01)
*G06T 15/40* (2011.01)
*G06T 15/06* (2011.01)
*G06T 17/00* (2006.01)

(52) U.S. Cl.
CPC ............... *G06T 15/06* (2013.01); *G06T 17/005* (2013.01); *G06T 2210/52* (2013.01)

(58) Field of Classification Search
CPC .... G06T 15/06; G06T 17/005; G06T 2210/52
See application file for complete search history.

(56) References Cited

U.S. PATENT DOCUMENTS

| 7,999,808 | B1 * | 8/2011 | Aila et al. ..................... 345/419 |
| 8,253,730 | B1 * | 8/2012 | Carr .............................. 345/419 |
| 2008/0192050 | A1 * | 8/2008 | Schardt et al. ................ 345/421 |
| 2010/0064291 | A1 * | 3/2010 | Aila et al. ..................... 718/104 |

* cited by examiner

*Primary Examiner* — Sing-Wai Wu
(74) *Attorney, Agent, or Firm* — Artegis Law Group, LLP

(57) ABSTRACT

Techniques are disclosed for tracing a ray within a parallel processing unit. A first thread receives a ray or a ray segment for tracing and identifies a first node within an acceleration structure associated with the ray, where the first node is associated with a volume of space traversed by the ray. The thread identifies the child nodes of the first node, where each child node is associated with a different sub-volume of space, and each sub-volume is associated with a corresponding ray segment. The thread determines that two or more nodes are associated with sub-volumes of space that intersect the ray segment. The thread selects one of these nodes for processing by the first thread and another for processing by a second thread. One advantage of the disclosed technique is that the threads in a thread group perform ray tracing more efficiently in that idle time is reduced.

20 Claims, 9 Drawing Sheets

FINE-GRAINED PARALLEL TRAVERSAL FOR RAY TRACING

BACKGROUND OF THE INVENTION

1. Field of the Invention

The present invention generally relates to three-dimensional (3D) graphics processing, and, more particularly, to fine-grained traversal for ray tracing.

2. Description of the Related Art

As used in the field of computer graphics, ray tracing is a technique for generating a realistic graphic image by tracing the path of light through the pixels in an image plane, such as the surface of a display device. Each path of light (or ray) is oriented to pass through one of the pixels in the image plane. Ray tracing then simulates the effects as each ray encounters objects in a three-dimensional (3D) graphics environment. As each ray encounters objects in the 3D graphics environment, the ray may reflect, refract, scatter, or disperse at the point of contact with each object.

Typically, the calculations to perform ray tracing are computationally intensive. In order to improve performance, ray tracing may be accelerated by tracing a set of rays simultaneously using a highly parallel computing device such as graphics processing unit (GPU). Such parallel processing devices include single-instruction multiple-thread (SIMT) and single-instruction multiple-data (SIMD) processors that execute each instruction on a group of parallel threads or parallel data lanes. These parallel processors benefit because the same instructions are performed on various data sets in a highly parallel manner. Alternatively, parallel execution of a large number of generally synchronized threads is performed, using a common instruction unit where different threads may follow divergent execution paths through a given thread program.

For example, a GPU with 32 computational paths could process 32 rays simultaneously by assigning one ray to each of the 32 computational paths. One problem with this approach is that processing for one ray may complete in a relatively short period of time while processing for another ray may complete in a relatively long period of time. As a result, some of the 32 computational units may complete processing their assigned rays and may enter an idle state pending completion of processing for all 32 rays. In such a case, performance is reduced because the idle computational units wait for other computational units to complete processing, and thus do not process rays or perform other computational tasks.

As the foregoing illustrates, what is needed in the art is an improved technique for ray tracing.

SUMMARY OF THE INVENTION

One embodiment of the present invention sets forth a method for tracing a ray within a parallel processing unit. The method includes receiving, at a first thread, at least a portion of a ray for tracing, and identifying a first node within an acceleration structure associated with at least a portion of the ray, where the first node is associated with a volume of space traversed by the ray. The method further includes identifying a plurality of nodes that comprise child nodes of the first node, where each node within the plurality of nodes is associated with a different sub-volume of space within the volume of space, and where each sub-volume of space is associated with a corresponding ray segment within at least a portion of the ray. The method further includes determining that two or more nodes within the plurality of nodes are associated with sub-volumes of space that intersect the at least a portion of the ray. The method further includes selecting a second node that comprises one node of the two or more nodes for processing by the first thread, and selecting a third node that comprises another node of the two or more nodes for processing by a second thread. The method further includes causing the second thread to process the third node.

Another embodiment of the present invention sets forth a method for tracing a ray within a parallel processing unit. The method includes receiving, at a first thread, at least a portion of a ray for tracing, and identifying a first node within an acceleration structure associated with at least a portion of the ray, where the first node is associated with a volume of space traversed by the ray. The method further includes identifying a plurality of nodes that comprise child nodes of the first node, where each node within the plurality of nodes is associated with a different sub-volume of space within the volume of space, and where each sub-volume of space is associated with a corresponding ray segment within at least a portion of the ray. The method further includes determining that two or more nodes within the plurality of nodes are associated with ray segments that intersect at least one graphics object. The method further includes selecting a second node that comprises one node of the two or more nodes for processing by the first thread, and selecting a third node that comprises another node of the two or more nodes for processing by a second thread. The method further includes determining that the second thread is processing at least a portion of a second ray, and placing an entry associated with the third node into a first data structure. The method further includes causing the second thread to retrieve the entry associated with the third node from the first data structure when the second thread has completed processing at least a portion of the second ray.

Other embodiments include, without limitation, a computer-readable medium that includes instructions that enable a processing unit to implement one or more aspects of the disclosed methods as well as a system configured to implement one or more aspects of the disclosed methods.

One advantage of the disclosed technique is that the threads in a thread group perform ray tracing more efficiently in that idle time is reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
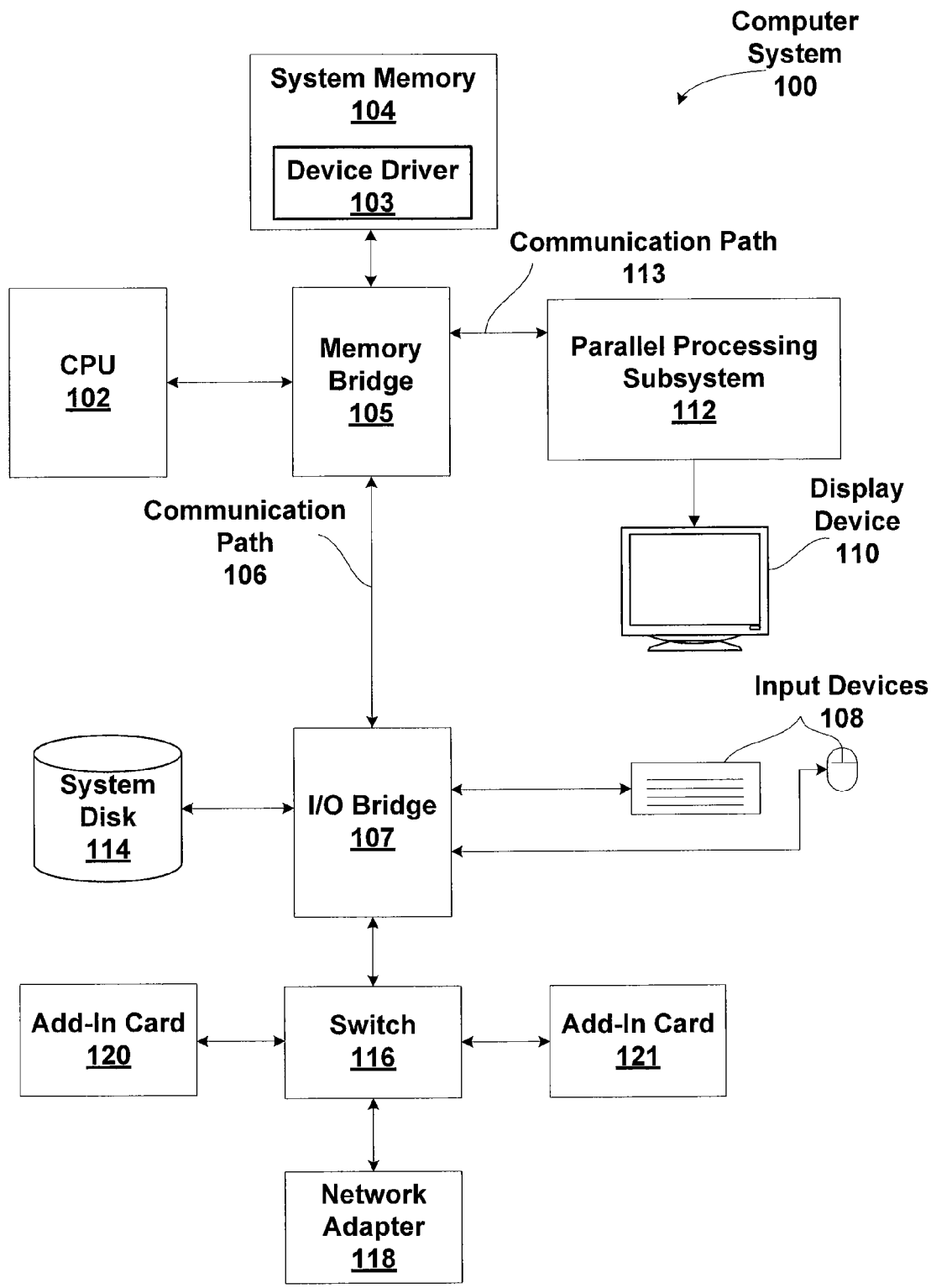
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
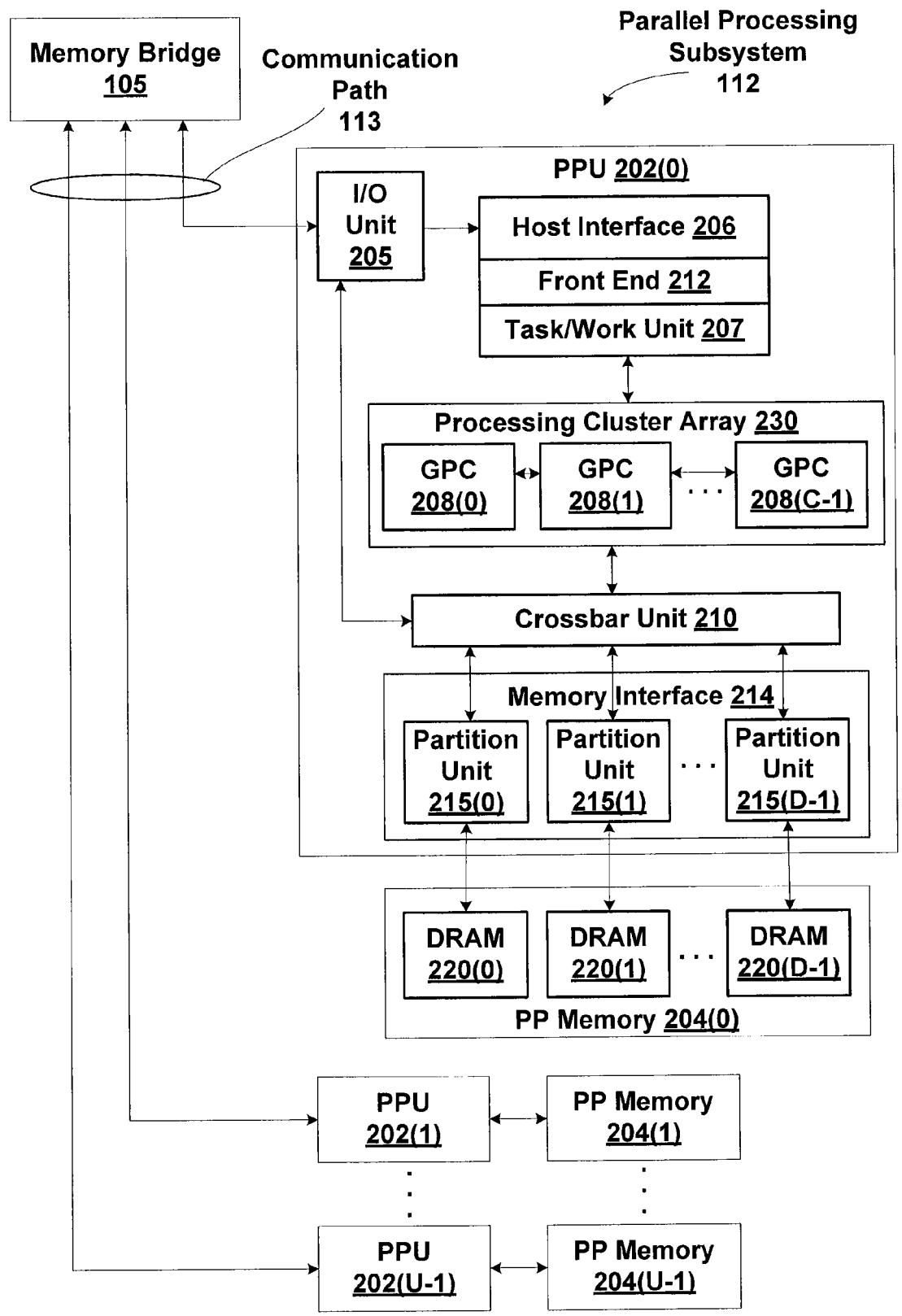
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Ray tracing is an example of an application that can be executed across a set of threads including, without limitation, the thread groups and CTAs described above. Ray tracing is accelerated on a parallel computing architecture, such as the PPU 202 of FIG. 2, by performing fine-grained parallel traversal of individual rays across a group of computations executed in parallel by multiple threads within a thread group. However the techniques described herein also apply to other parallel execution models, such as traditional CPU vector registers, or on any architecture capable of tracing multiple rays or ray segments via a common instruction stream.

Fine-Grained Traversal for Ray Tracing

Figure 3:
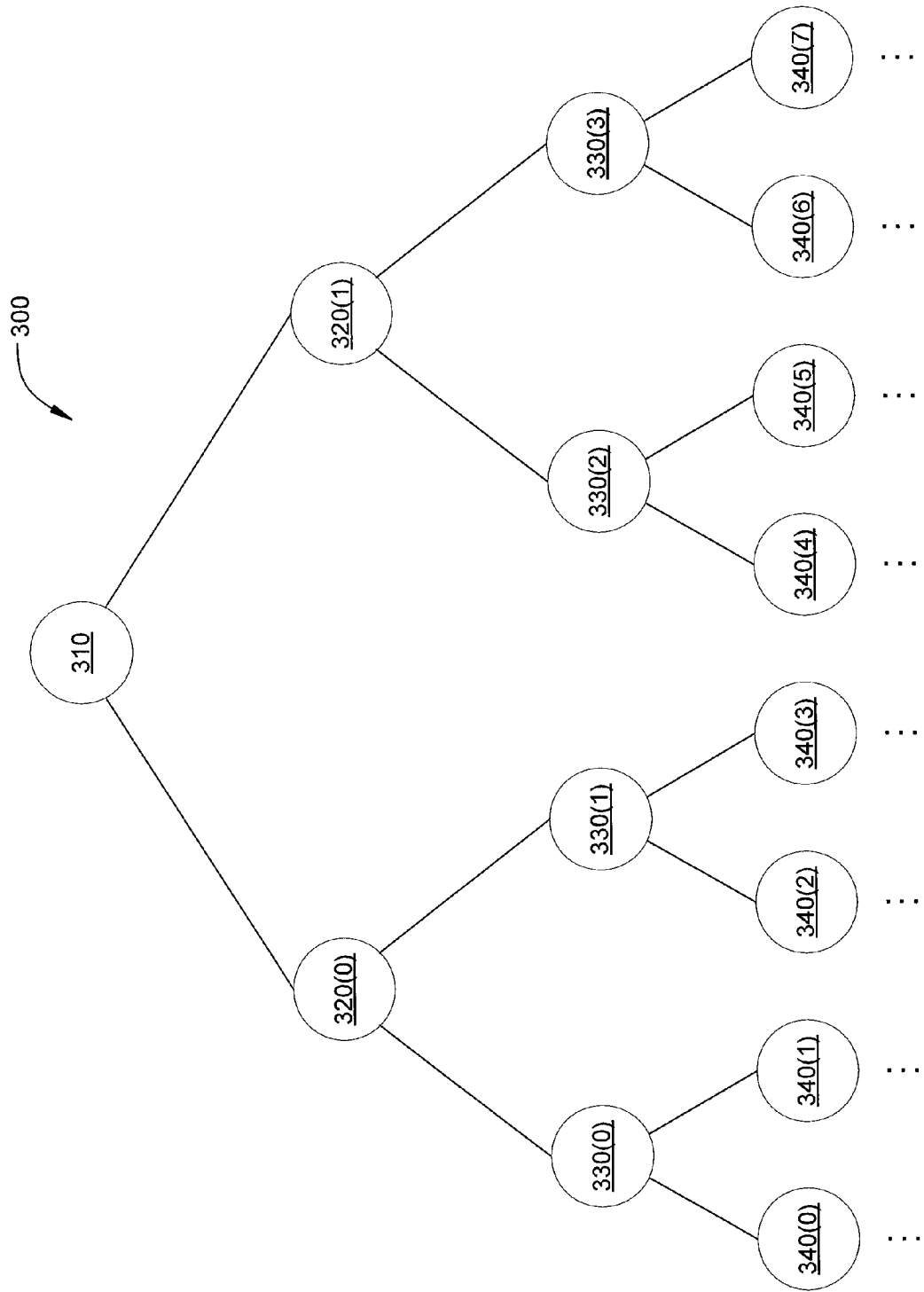
FIG. 3 illustrates an acceleration structure representing a volume traced by a ray using the parallel processing unit of FIG. 2, according to one embodiment of the present invention.

FIG. 3 illustrates an acceleration structure 300 representing a volume traced by a ray using the parallel processing unit 202 of FIG. 2, according to one embodiment of the present invention. As shown, the acceleration structure 300 includes a root node 310, level one nodes 320, level two nodes 330, and level three nodes 340.

The acceleration structure 300 is shown in the form of a binary space partitioning tree. The root node 310 represents the entire volume of space traveled by a ray as the ray is traced through a 3D graphics scene. As further described below, the volume represented by the root node 310 is divided into two or more sub-volumes and traced by separate ray segments, where the sub-volumes are identified as various nodes below the root node 310.

The level 1 nodes 320 each represent a volume that forms a portion of the volume by the root node 310. The root node 310 is connected to two level 1 nodes 320(0) 320(1), These two level 1 nodes 320(0) 320(1) are called the child nodes of the root node 310, and the root node 310 is the parent node of the two level 1 nodes 320. Taken together, the level 1 child nodes represent the entire volume represented by the root node 310.

The level 2 nodes 330 further divide the volume defined by the level 1 nodes 320. Level 1 node 320(0) includes two level 2 child nodes 330(0) 330(1), each of which represents a volume that forms a portion of the volume represented by the parent node 320(0). Level 1 node 320(1) includes two level 2 child nodes 330(2) 330(3), each of which represents a volume that forms a portion of the volume represented by parent node 320(1).

The level 3 nodes 340 further divide the volume defined by the level 2 nodes 330. Level 2 node 330(0) includes two level 3 child nodes 340(0) 340(1), each of which represents a volume that forms a portion of the volume represented by parent node 330(0). Level 2 node 330(1) includes two level 3 child nodes 340(2) 340(3), each of which represents a volume that forms a portion of the volume represented by parent node 330(1), and so on. The volume represented by each level 3 node 340 may be further divided into smaller volumes represented by child nodes (not shown) at deeper levels within the tree.

During ray tracing, threads trace paths of light (rays) moving through a geometric scene, where the geometric scene includes one or more graphics objects. In some embodiments, the threads may determine the first graphics object encountered along a ray. For example, the first object encountered by a given ray along a specified direction is associated with what a viewer sees in that direction. In other embodiments, the threads may determine that at least one graphics object exists along the ray, without determining whether an object is the first graphic object encountered by the ray. Such a determination may be relevant for determining whether a graphics object casts a shadow on another graphics object. For example, if a graphics object exists between a point on a surface and a light source, then that point would be shadowed from that light source. More than one object could be shadowing the light, but the thread need only determine whether any graphics object is shadowing the light source. Once a thread determines that at least one object shadows the light source, the thread would cease tracing the ray. In such cases, the rays traced by the thread are called shadow rays.

During ray traversal, a thread receives a ray or a ray segment and a starting node within the acceleration structure 300, where the node includes a volume of space to be traced by the ray segment. Each ray segment includes a direction, a start point, and an end point. The thread determines whether the ray segment intersects with a graphics object included within any of the child nodes of the starting node. The thread visits each child node using any technically feasible approach, including, without limitation, in order of distance from the screen surface of the display device 103, or in order of likelihood that the child node contains a graphics object that intersects with the ray segment.

The thread selects a first node to process and postpones the remaining nodes, if any, by appending information related to the postponed nodes to a data structure for later processing. Such postponed nodes are visited later if, for example, the ray segment does not intersect any primitives while traversing the first node. Such a data structure may be in any technically form, including, without limitation, a work stack, a queue, or an unsorted pool or buffer. Each entry in the data structure includes a ray segment and an associated node. In some embodiments, a ray segment, including the start and end points of the ray segment, may be explicitly stored in the data structure with the associated node. In other embodiments, the ray segment may be defined implicitly, where the data structure may be associated with a given ray, and the start and end points of each ray segment may be calculated based on the intersection of the ray segment with the volume represented by the associated node.

As shown, the acceleration structure 300 includes three levels below the root node 310. In one embodiment, each branch of the acceleration structure 300 may include any arbitrary number of levels. The number of levels for any branch within the acceleration structure 300 may be determined by using any number of factors, including, without limitation, the number of graphics objects within a scene, and the number of graphics primitives stored at each leaf node. Typically, when the volume of space represented by a given node includes only a small number of graphics primitives, the volume, and the associated node, are not subdivided further. As a result, the node representing such a volume is not associated with any child nodes. Such a node is called a leaf node, where a leaf node represents a volume of space that includes the small number of graphics objects or graphics primitives, such as a point, line segment, or triangle. In one embodiment, the child nodes of a given node include all nodes at any level below the given node that connect to the given node, either directly or through one or more intermediate nodes.

A PPU 202 traces a given ray by traversing the acceleration structure 300 starting at the root node 310. A PPU 202 traces a ray segment associated with the ray by traversing a subtree of the acceleration structure 300. In such a case, the PPU 202 starts tracing the ray segment at the node representing the starting point of the sub-volume to be traced by the ray segment. At any given node, the PPU 202 determines whether a particular node is associated with a graphics object or primitive that intersects with the current ray or ray segment. If the ray or ray segment intersects at least one graphics object or primitive, then the ray or ray segment is said to have "hit" the graphics object or primitive. The acceleration structure 300, or a subtree thereof, is said to be traversed when sufficient child nodes are visited to determine whether the ray or ray segment has hit one or more graphics objects or primitives within a 3D scene. In some embodiments, the PPU 202 also determines which of the hit objects is closest to a surface plane representing the screen surface of a display device. Traversal operations and intersection computations may be accelerated by using the techniques presented herein.

As typically implemented in ray tracing, the PPU 202, in performing a traversal operation, receives a ray or a ray segment and a corresponding node within the acceleration structure 300 as input. The node resides at a given level of the acceleration structure 300, specifically at the root node 310 for the entire volume of the scene, or some other node for a sub-volume represent a portion of the entire volume. The PPU 202 determines the location of an intersection of the ray or ray segment with a graphics object or primitive by first determining whether the ray or ray segment hits a bounding volume represented by a node, and then determining whether the ray or ray segment hits the bounding volume represented by each of the node's child nodes. Typically, traversal and intersection operations are performed using a depth-first search approach. If the ray or ray segment hits more than one child node, then the PPU 202 pushes the far child node or nodes onto a work stack or places the far node or nodes in a shared work buffer. The PPU 202 then selects the nearest hit node for further traversal. When a hit is detected on a leaf node, the PPU 202 determines whether the ray or ray segment intersects with any of the graphics objects or primitives in the hit leaf node. If there is an intersection, the PPU 202 stores information related to the intersected graphics objects or primitives. The process continues, with the PPU 202 processing near nodes and deferring computations for far nodes, until a leaf node is reached or a ray segment is determined to have no hits. The PPU 202 then pulls a deferred far node from the work stack or retrieves a deferred far node from the work buffer if no hit has yet been discovered. The PPU 202 continues to retrieve deferred far nodes until all deferred far nodes have been processed or the traversal operation otherwise terminates.

When a thread completes tracing of an assigned ray or ray segment, the thread signals completion to the PPU 202. The PPU 202 may then assign this thread to trace a ray or ray segment deferred by another thread. In this manner, multiple threads trace various ray segments for a given ray in parallel, a process identified herein as fine-grained ray traversal. Various approaches may be used to assign ray segments for a given ray to multiple threads within a thread group.

In one embodiment, when a thread determines that a ray segment hits both child nodes, the thread may sub-divide the current ray or ray segment into two smaller ray segments, where the each of the two smaller ray segments traverses the sub-volume of space represented by one of the two child nodes. The thread may select the node associated with the near sub-volume for processing. The thread may then assign the node associated with the far sub-volume to another available thread for processing. As traversal of the assigned ray or ray segment continues, the ray may continue to assign available threads to process additional far ray segments associated with hit far child nodes. Additional ray segments may be assigned to process child nodes as needed at each level in the acceleration structure 300 until there are no remaining threads available for assignment. Such an approach is called breadth-first traversal. In some embodiments, the PPU 202 may not assign ray segments to other available threads unless the number of available threads exceeds a given threshold.

In another embodiment, the PPU 202 initially may assign a ray or ray segment to each of the threads within a thread group for tracing. Each thread may maintain a local work stack for deferring nodes associated with far ray segments for later processing. As each thread completes tracing the assigned ray or ray segment associated with a given node, the thread may signal completion of the assigned ray or ray segment and may then enter an idle state. The PPU 202 may then assign a node associated with another thread to the idle thread for processing. As a result, long-running threads processing complex rays or ray segments may receive assistance from threads that complete early. The nodes available for assignment may be generated from breadth-first traversal, as described above. Alternatively, the nodes may be pulled from another thread's active work stack. In the latter case, a node may be pulled from the top or from the bottom of the still-active thread's work stack, or from any other technically feasible position within the middle of the still-active thread's work stack. In some embodiments, the portion of the thread instructions associated with retrieving nodes from another thread's work stack may be placed outside of the critical execution loop, thereby further improving efficiency. This approach may be advantageous when one or more threads trace complex rays or ray segments over a period of time that is significantly longer as compared to other threads in the thread group.

In yet another embodiment, when a thread's ray segment hits multiple child nodes, the thread may place the deferred nodes corresponding to far child nodes into a shared work buffer. Such a work buffer may be organized using any feasible data structure, including, without limitation, a queue, a stack, or a linked list. The work buffer may be shared by all threads in the thread group. When any thread completes tracing of a ray or a ray segment, the thread may retrieve a new node associated with another ray segment from the shared work buffer. Such a shared work buffer may have a static size. Alternatively, the size of the shared work buffer may be dynamically determined, depending on the number of deferred nodes at any given time. In one embodiment, a portion of the shared work buffer may be stored in local fast on-chip memory. If the local on-chip memory runs out of available memory space, then further deferred nodes may be placed into an associated off-chip memory that may be larger and slower than the on-chip memory.

Each of the above embodiments for assigning ray segments to multiple threads may be used alone or in any combination. All such possible combinations and permutations fall within the scope of the present invention. In one example, a hybrid approach could be used in which a thread initially could defer nodes by placing the deferred nodes into the shared work buffer. If the shared work buffer is full, then the thread could defer additional nodes by pushing the nodes onto the thread's local work stack. In another example, a thread could initially defer nodes by pushing the deferred nodes onto a local work stack. Later, when some threads have completed tracing and are idle, the thread could defer additional nodes by placing the deferred nodes into the shared work buffer.

It will be appreciated that the architecture described herein is illustrative only and that variations and modifications are possible. In one example, the techniques described herein could use special-purpose instructions, called warp-synchronous instructions that facilitate communication among threads within a group of threads. Two such instructions, identified as VOTE.any and VOTE.all, would report whether a specified condition is true for any or all threads in a thread group. Such instructions could be useful for tracing shadow rays, where visibility between two points is determined. In such a case, all relevant threads tracing a shadow ray could terminate when a VOTE.any instruction indicates that any one or more of the relevant threads report a hit. Such instructions could also be used for various other functions, including, without limitation, finding threads that are available for assignment, finding threads that include one or more segments have deferred nodes, and determining the closest hit among multiple hits. A third instruction, identified as VOTE.ballot, would return an integer, where each bit of the integer could be set if a condition is true for the corresponding thread. A companion instruction could count the number of set bits within the integer. Using such instructions, the PPU 202 could invoke fine-grained ray tracing only when a threshold number of threads have completed their assignments and available for new assignments.

In another example, when a hit is determined for a given ray, some threads could be tracing ray segments for the same ray that are more distant than the hit. Such threads could be reassigned to nodes that are closer than the discovered hit. In yet another example, memory associated with the acceleration structure 300 could be organized to improve memory coherence and localization, improving performance of the various caches. Such organizations could include, without limitation, a breadth-first layout of the nodes, where all nodes at the same level of the acceleration structure 300 would be adjacent in memory, or a partial breadth-first layout, where sibling nodes (having the same parent node) or cousin nodes (having parent nodes that are siblings) would be adjacent in memory.

In yet another example, a group of threads could be deployed to work on multiple sets of subtrees for a group of rays or ray segments. In such a case, a group of 32 threads could be deployed to trace four subtrees for eight rays, eight subtrees for four rays, or any other technically feasible combination. In yet another example, an idle thread may retrieve multiple nodes associated with rays or ray segments from another thread's work stack or from the shared work buffer, rather than retrieving a node associated with a single ray or ray segment.

As described herein, the acceleration structure 300 is presented as a binary space partitioning tree. However, the techniques described herein may be represented via any technically feasible data structure, including, without limitation, a k-d tree or a bounding volume hierarchy. In some embodiments, the volume represented by a parent node may be exactly equal to the sum of the volumes of the child nodes. In such a case, the volumes represented by the child nodes may be disjoint, in that the child nodes have no overlapping portions with respect to each other. In other embodiments, the volumes represented by a set of child nodes may overlap, and the parent node may include space not included in any child node. In some embodiments, a node within the acceleration structure 300 may have more than two child nodes, as further discussed below.

Figure 4:
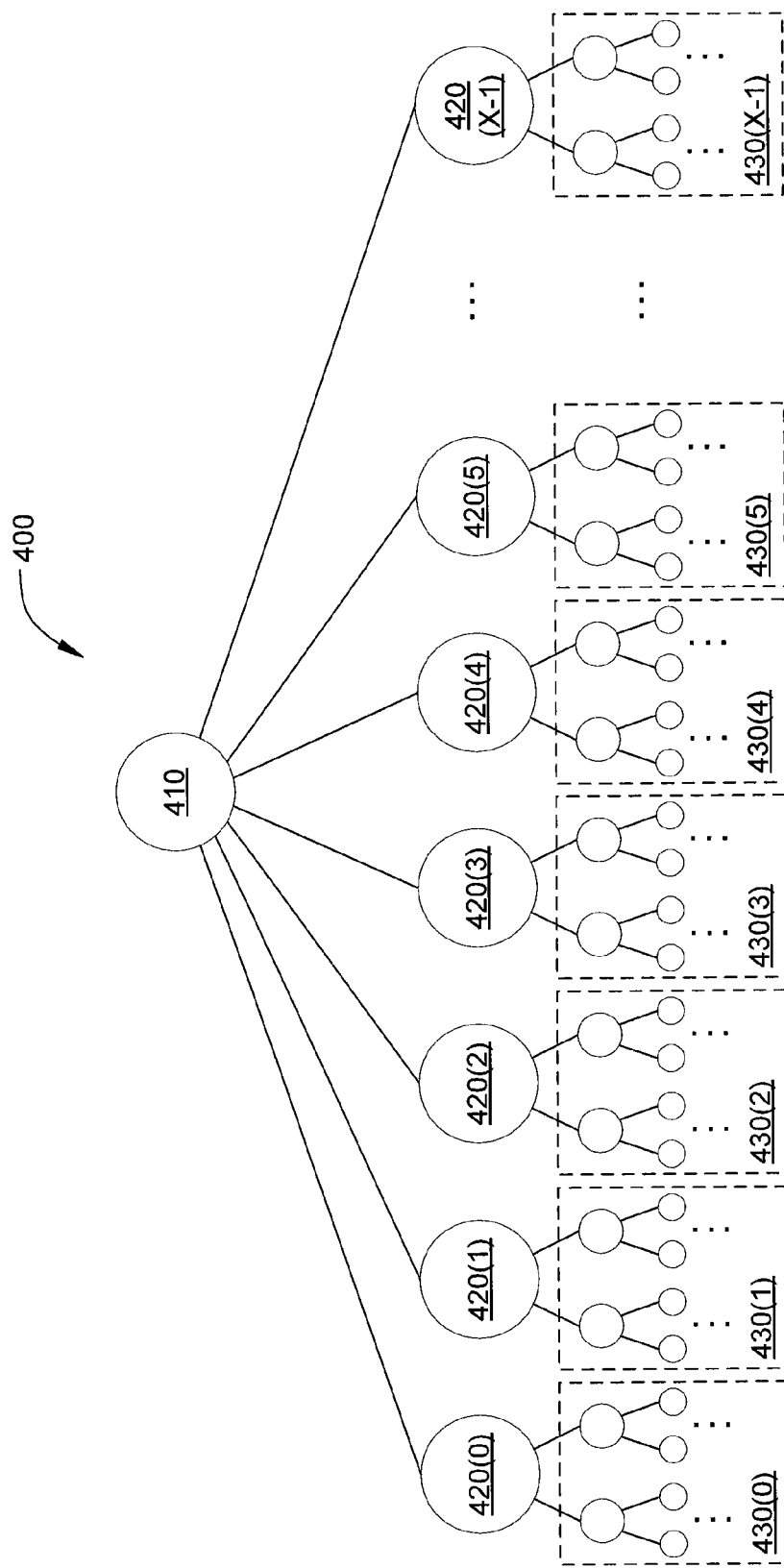
FIG. 4 illustrates an acceleration structure representing a volume traced by a ray using the parallel processing unit of FIG. 2, according to another embodiment of the present invention.

FIG. 4 illustrates an acceleration structure 400 representing a volume traced by a ray using the parallel processing unit 202 of FIG. 2, according to another embodiment of the present invention. As shown, the acceleration structure 400 includes a root node 410, level one nodes, 420, and sub-trees 430. The root node 410 and level one nodes, 420, function substantially the same as described in conjunction with FIG. 3, except as further described below.

Here, the root node 410 includes X level 1 child nodes 420(0)-420(X−1), where each level 1 child node represents a sub-volume of space that forms a portion of the volume represented by the root node 410. As a result, X threads may be assigned at a single level with in the acceleration structure 400. Such an approach allows a set of threads to more quickly be deployed to traverse the volume represented by the root node via dividing the traversal among multiple ray segments, where each ray segment traverses the volume represented by one of the X level 1 child nodes 420(0)-420(X−1).

The sub-trees 430 represent one or more nodes associated with each of the level 1 nodes 420. Each sub-tree 430 is traversed as the ray segment for the corresponding level 1 parent node 420 is traced. As also shown, the root node 410 includes N child nodes at level 1 of the acceleration structure 400. In one embodiment, each node of the acceleration structure 400, other than leaf nodes, may be associated with any number of child nodes.

Figure 5:
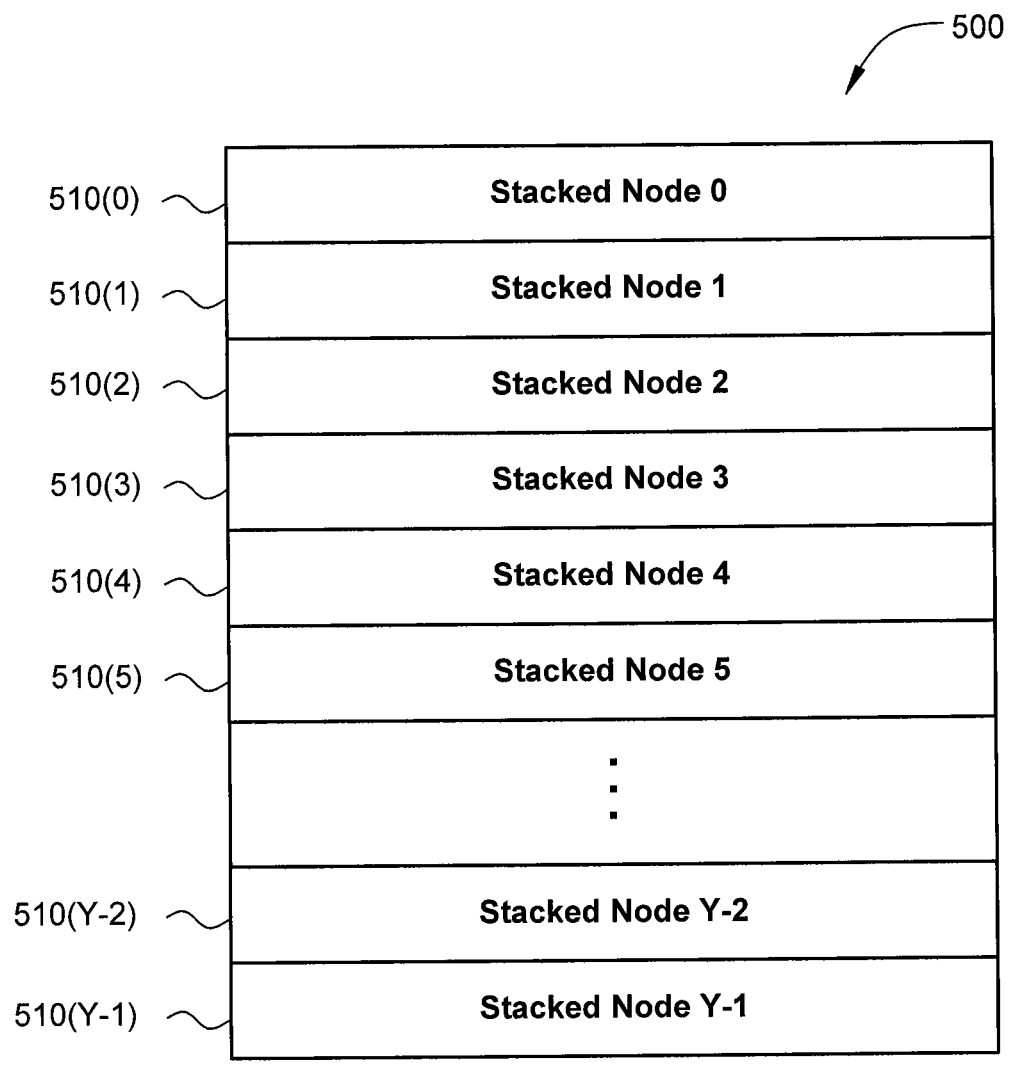
FIG. 5 illustrates a work stack used by a thread within the parallel processing unit of FIG. 2, according to one embodiment of the present invention.

FIG. 5 illustrates a work stack 500 used by a thread within the parallel processing unit 202 of FIG. 2, according to one embodiment of the present invention. As shown, the work stack includes stacked nodes 510.

The stacked nodes 510 include pointers to various nodes in the acceleration structure 300 to be processed during the trace of a given ray. When a thread processes a current node, the thread evaluates each child node of the current node to see which child nodes are associated with a ray segment that has a hit for at least one graphics object. If multiple child nodes report a hit during tracing of a ray or ray segment, then the thread performing the trace selects one of the "hit" child nodes as the current node. The other hit nodes are pushed onto the work stack 500 for later processing.

In one example, the first node pushed onto the work stack 500 could be represented by stacked node 0 510(0), the second node pushed onto the work stack 500 could be represented by stacked node 1 510(1), and so on. The size of the work stack 500 increases as nodes are pushed onto the work stack 500 and decreases in size as nodes are pulled from the work stack 500. As shown, the work stack 500 includes Y stacked nodes 510 numbered from 510(0) through 510(Y−1), where stacked node 510(Y−1) represents the node most recently pushed onto the work stack 500, and stacked node 510(0) represents the node least recently pushed onto the work stack 500.

As described above, threads that are idle may pull stacked nodes 510 from the work stack 500 associated with other threads. In such a case, an idle thread identifies another thread with a work stack 500 that includes at least one stacked node 510, and removes the stacked node 510 for processing. The idle thread may pull the most recently stacked node 510(Y−1) from the work stack 500 for processing, since stacked node 510(Y−1) represents the node that the original thread pulls first for processing from the work stack 500. Alternatively, the idle thread may pull the least recently stacked node 510(0) from the work stack 500 for processing, or the idle thread may select any stacked node 510 from the work stack 500. In one embodiment, stacked nodes 510 may include a reference to the node representing the volume to be traversed and a reference to the ray segment traversing the volume.

Figure 6:
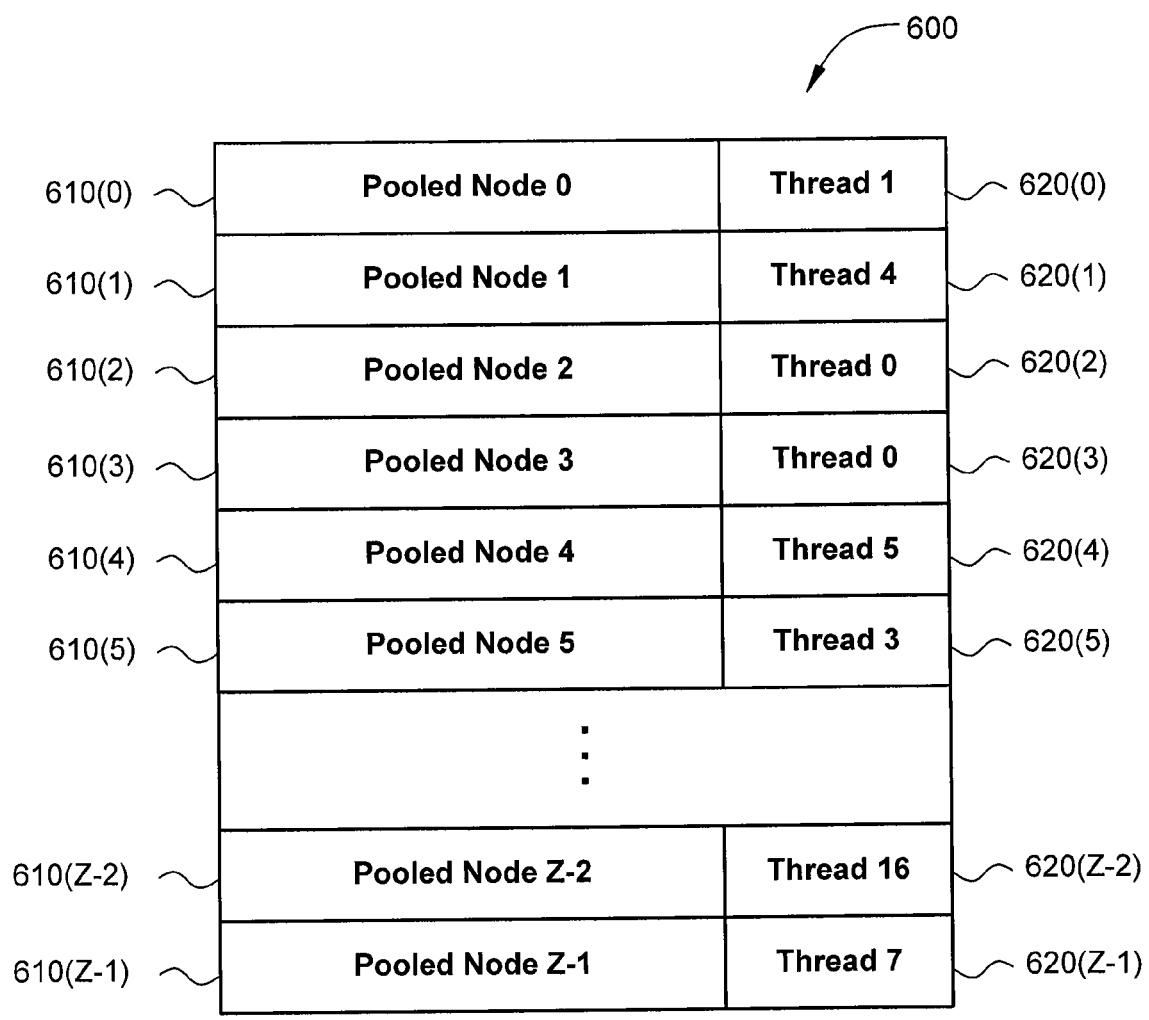
FIG. 6 illustrates a memory buffer shared by multiple threads within the parallel processing unit of FIG. 2, according to one embodiment of the present invention.

FIG. 6 illustrates a work buffer 600 shared by multiple threads within the parallel processing unit 202 of FIG. 2, according to one embodiment of the present invention. As shown, the work buffer includes pooled nodes 610 and thread identifiers 620.

The pooled nodes 610 include pointers to various nodes for a set of threads, where the nodes have been placed into work buffer for later processing 600. When a thread processes a current node, the thread evaluates each child node of the current node to see which child nodes are associated with a ray segment that has a hit for at least one graphics object. If multiple child nodes report a hit during tracing of a ray or ray segment, then the thread performing the trace selects one of the "hit" child nodes as the current node. The other hit nodes are placed into the work buffer 600 for later processing.

In one example, the first node placed into the work buffer 600 is represented by pooled node 0 610(0), the second node placed into the work buffer 600 is represented by pooled node 1 610(1), and so on. The size of the work buffer 600 may be static, or the size of the work buffer 600 may increase or decrease dynamically based on the number of pooled nodes 610 present in the work buffer 600. As shown, the work stack includes Z pooled nodes 610 numbered from 610(0) through 610(Z−1), where pooled node 610(Z−1) represents the node most recently placed into the work buffer 600, and pooled node 610(0) represents the node least recently placed into the work buffer 600.

As described above, threads that are idle may select pooled nodes 610 from the work buffer 600 associated with the set of threads. In such a case, an idle thread searches the work buffer 600, and selects one of the pooled nodes 610 for processing. The idle thread may select any pooled node 610 from the work buffer 600.

The thread identifiers 620 indicate the thread that placed a corresponding pooled node 610 into the work buffer 600. As shown, thread identifier 620(0) indicates that thread 1 placed pooled node 610(0) into the work buffer, thread identifier 620(1) indicates that thread 4 placed pooled node 610(1) into the work buffer, and so on. In one embodiment, when an idle thread selects a pooled node 610 for processing, the idle thread may use the corresponding thread identifier 620 to send messages to the original thread under certain conditions, including, without limitation, the pooled node includes a graphics object that intersects with an associated ray segment, that the pooled node 610 includes a hit object that is closer to the screen surface than the closest hit so far, or the pooled node 610 is associated with a ray segment that has spawned at least one additional ray. When a thread completes processing for a pooled node 610, the thread identifies completion by any technically feasible means, including, without limitation, setting a flag in the corresponding pooled node 610, clearing the pooled node 610, or setting the thread identifier 620 to a specific value. In one embodiment, pooled nodes 610 may include a reference to the node representing the volume to be traversed and a reference to the ray segment traversing the volume.

Figure 7A:
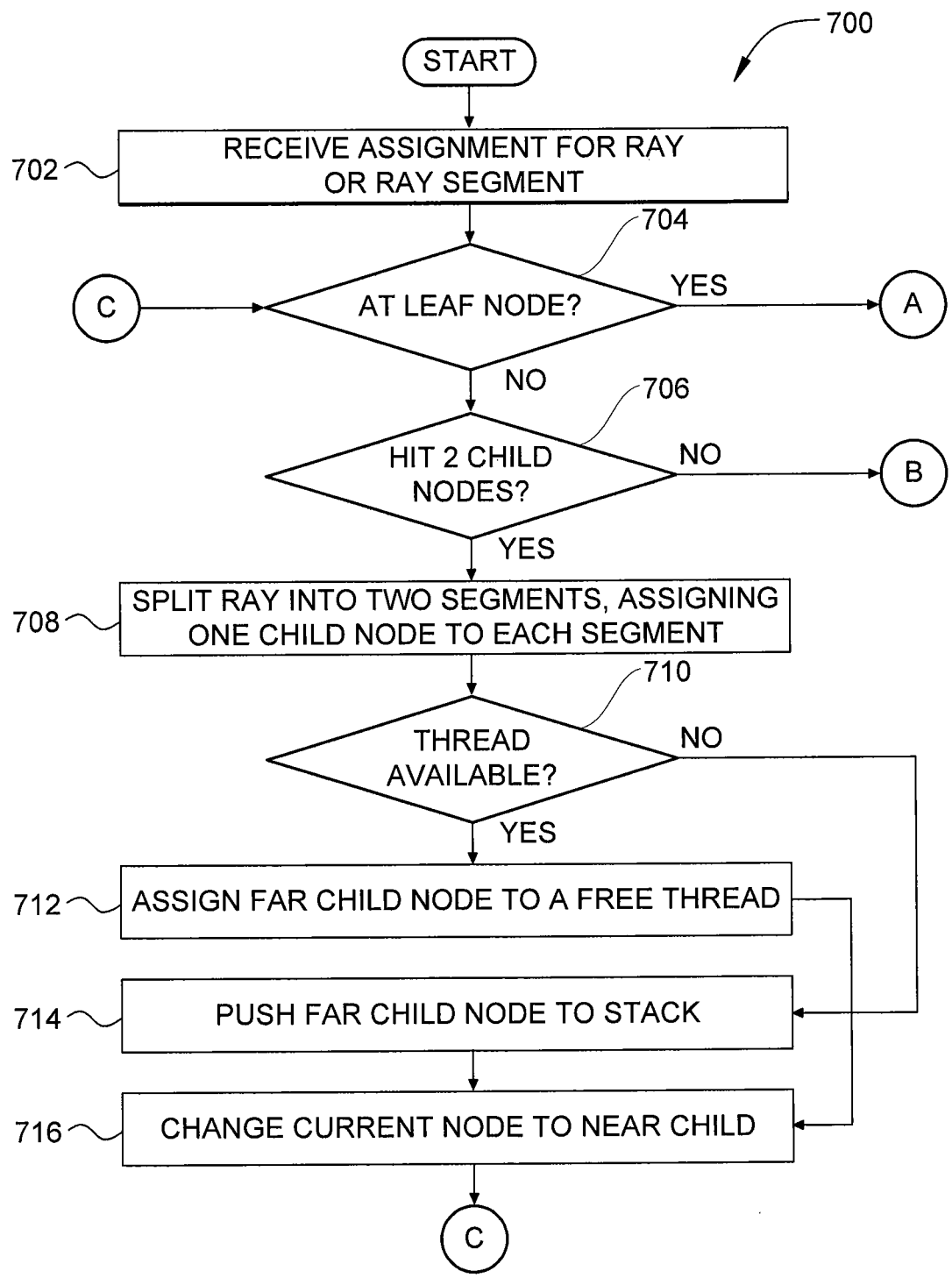
FIGS. 7A-7C set forth a flow diagram of method steps depicting tracing a ray using multiple threads within the parallel processing unit of FIG. 2, according to one embodiment of the present invention.
Figure 7B:
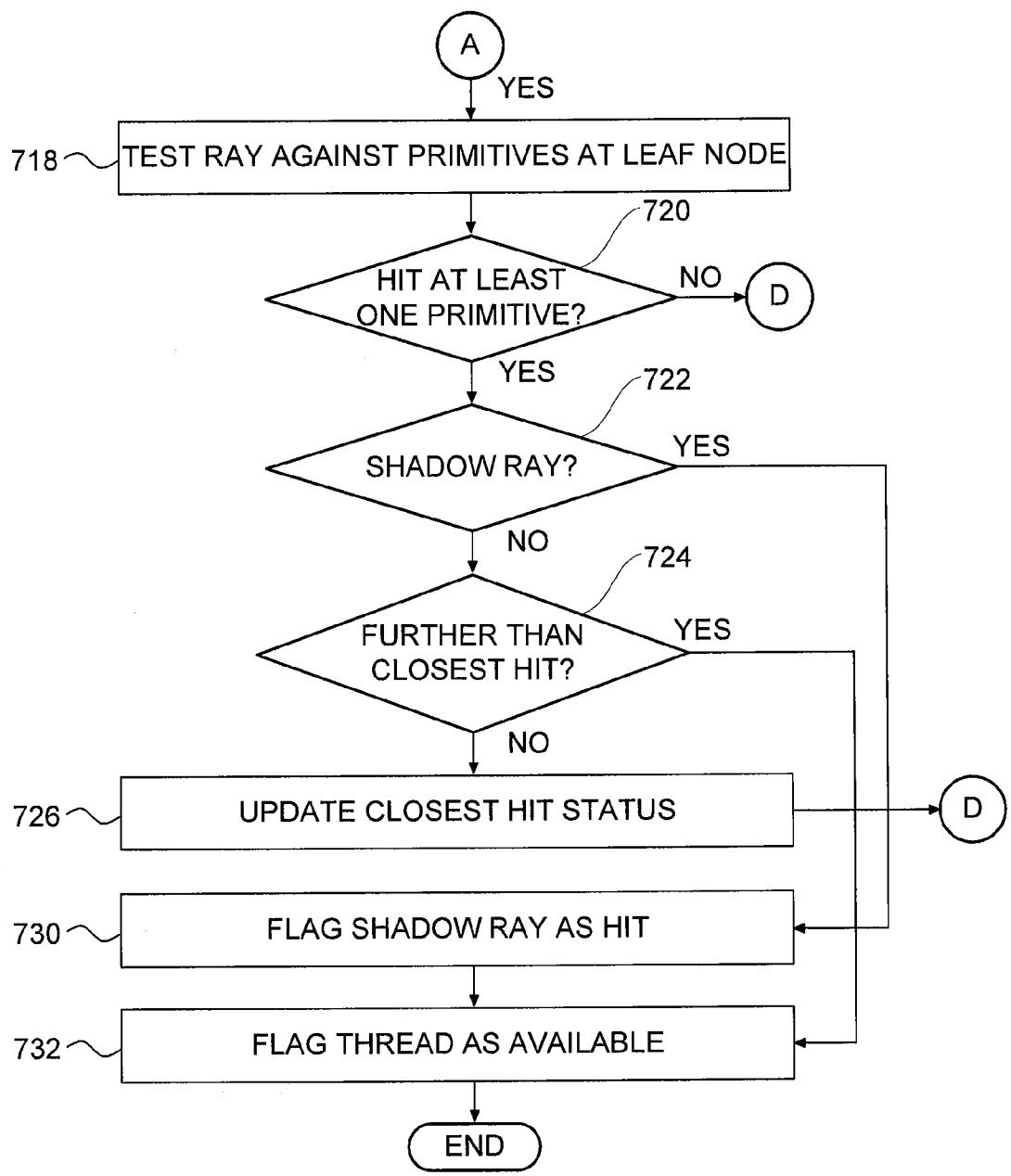
Figure 7C:
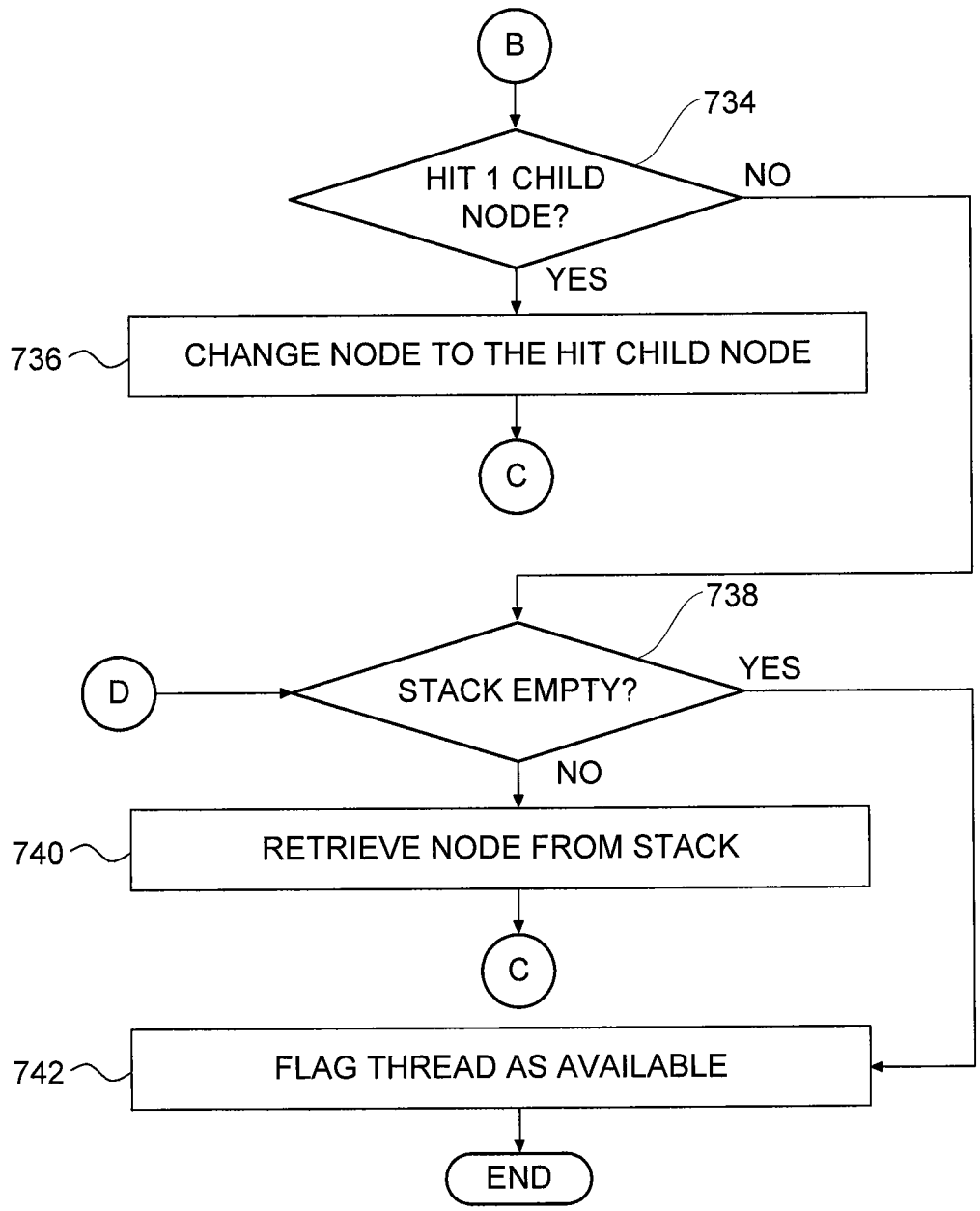

FIGS. 7A-7C set forth a flow diagram of method steps depicting tracing a ray using multiple threads within the parallel processing unit 202 of FIG. 2, according to one embodiment of the present invention. Although the method steps are described in conjunction with the systems of FIGS. 1-6, persons of ordinary skill in the art will understand that any system configured to perform the method steps, in any order, is within the scope of the inventions.

The method 700 begins at step 702, where the parallel processing unit (PPU) 202 receives an assignment to trace a ray or a ray segment for the purpose of rendering an image using ray tracing. In various embodiments, the assignment may be received from a ray tracing program application or from a thread that has created one or more rays or ray segments during execution of a thread. The PPU 202 sets the current node to the volume associated with the ray or ray segment according to the received assignment. If the received assignment is to trace a complete ray, then the PPU 202 sets the current node to the root node of the acceleration structure. If the received assignment is to trace a ray segment, then the PPU 202 sets the current node to the topmost node in the subtree to be traversed by the ray segment.

At step 704, the PPU 202 determines whether the current node is a leaf node, where a leaf node is a node that has no corresponding child nodes. If the current node is not a leaf node, then the method 700 proceeds to step 706, where the PPU 202 determines whether the ray or ray segment has two child nodes. If the ray or ray segment has hit two child nodes, then the method 700 proceeds to step 708, where the PPU 202 creates two ray segments by splitting the current ray into two ray segments, where each ray segment corresponds to the two hit child nodes.

At step 710, the PPU 202 determines whether any threads are available to trace one of the ray segments. If a thread is available to process one of the ray segments, then the method 700 proceeds to step 712, where the PPU 202 assigns the far ray segment to an available thread. If, however, at step 710 there is no thread available to trace one of the ray segments, then the method 700 proceeds to step 714, where the PPU 202 pushes the node corresponding to the far ray segment onto the work stack 500. Alternatively, the PPU 202 places the node corresponding to the far ray segment into the work buffer 600.

From either step 712 or step 714, the method 700 proceeds to step 716, where the PPU 202 changes the current node to the near child node. The method 700 then proceeds to step 704, described above.

Returning now to step 706, if the ray or ray segment has not hit two child nodes, then the method 700 proceeds to step 734, where the PPU 202 determines whether the ray or ray segment has hit one child node. If the ray or ray segment has hit one child node, then only the ray or ray segment that hit a child node needs further processing. The method 700 proceeds to step 736, where the PPU 202 changes the current node to the hit child node. The method 700 then proceeds to step 704, described above.

If, however, at step 734, the ray or ray segment has not hit one child node, then the method 700 proceeds to step 738. In such a case, the ray or ray segment has not hit either of the child nodes, and neither of the child nodes need further processing. At step 738, the PPU 202 determines whether the work stack 500 is empty. If the work stack 500 is not empty, then the method 700 proceeds to step 740, where the PPU 202 retrieves a node from the work stack 500. The method 700 then proceeds to step 704, described above.

If, however, at step 738, the stack is empty, then the method 700 proceeds to step 742, where the PPU 202 flags the thread as available to process other rays or ray segments. In some embodiments, the PPU 202 may flush the work stack 500 or the work buffer 600 of any remaining work items related to processing the ray or ray segment. The method 700 then terminates.

In some embodiments, a ray tracing program application may recognize that the thread is available, and may assign another ray or ray segment to the thread. In an embodiment, the PPU 202 may determine whether additional nodes are waiting for processing, and may retrieve such a node from either another thread's work stack 500 or from the shared work buffer 600. In such a case, PPU 202 may set the current node to the retrieved node. The method 700 may then proceeds to step 704, described above.

Returning now to step 704, if the current node is a leaf node, then the method 700 proceeds to step 718, where the PPU 202 tests the ray or ray segment against the geometry objects or the geometry primitives associated with the leaf node. At step 720, the PPU 202 determines whether the ray has hit any geometric objects or primitives inside the leaf node. In some embodiments, if the ray has hit multiple geometric objects or primitives inside the leaf node, then the PPU 202 may select the hit graphics object or primitive that is nearest to the screen surface of the display device 103. If the ray has not hit any geometric objects or primitives inside the leaf node, then the method 700 proceeds to step 738, described above. If, however, the ray has hit at least one geometric object or primitive inside the leaf node, then the method 700 proceeds to step 722, where the PPU 202 determines whether the current ray or ray segment is associated with a shadow ray. If the current ray or ray segment is associated with a shadow ray, then the method 700 proceeds to step 730, where the PPU 202 flags the shadow ray has a hit. As described above in conjunction with FIG. 3, processing of a shadow ray completes when the ray encounters a hit along any ray segment.

At step 732, the PPU 202 flags the thread as available to process other rays or ray segments. In some embodiments, the PPU 202 may flush the work stack 500 or the work buffer 600 of any remaining work items related to processing the ray or ray segment. The method 700 then terminates.

In some embodiments, a ray tracing program application may recognize that the thread is available, and may assign another ray or ray segment to the thread. In an embodiment, the PPU 202 may determine whether additional nodes are available for processing, and may retrieve such a node from either another thread's work stack 500 or from the shared work buffer 600. In such a case, PPU 202 may set the current node as the retrieved node. The method 700 may then proceeds to step 704, described above.

Returning now to step 722, if, the current ray or ray segment is not associated with a shadow ray, then the method 700 proceeds to step 724, where the PPU 202 determines whether the current ray segment is farther away that the currently reported closest hit for that ray. If the current ray segment is farther away than the closest hit, then objects hit by the current ray segment are obstructed by a graphics object or primitive associated with the closest hit. In such a case, the current ray segment does not need further processing. The method 700 proceeds to step 732, described above.

If, however, at step 724, the current ray segment is not farther away than the closest hit, then the method 700 proceeds to step 726, where the PPU 202 updates the closest hit status for the current ray to the location corresponding to the hit at the current ray segment. The method 700 then proceeds to step 738, described above.

The method 700 has been described in the context of a acceleration structure where each node has, at most, two child nodes. However, the method 700 is sufficiently flexible to accommodate acceleration structures where one or more nodes have more than two corresponding child nodes. In such a case, the PPU may determine, at step 706, that more than two ray segments represented by child nodes have a hit. In such a case, the PPU 202 creates a ray segment for each hit node, and selects one of the hit nodes, such as the nearest node, to process. The PPU 202 then either assigns the other hit nodes to available threads, pushes the other nodes onto the work stack 500, or places the other hit nodes into the work buffer 600. In some embodiments, the PPU 202 may assign some of the hit nodes to available threads. The PPU 202 may then push the remaining hit nodes onto the work stack 500 or place the other hit nodes into the work buffer 600.

In sum, processing rays in a ray tracing environment is efficiently performed. As a thread traces the node tree for a given ray, the thread encounters nodes where the ray hits multiple branches in the node tree. The thread creates a ray segment for each of the hit nodes and selects one for tracing. The remaining hit nodes may be assigned to other threads for tracing. Alternatively, the remaining hit nodes are pushed onto a stack associated with the thread or into a shared memory buffer that includes hit nodes for a group of threads. When a thread completes tracing for an assigned ray, the thread becomes available for additional ray or ray segment assignments. Such a thread may query the stack for another thread or may search the shared memory buffer for additional ray segments to trace.

One advantage of the disclosed techniques is that idle time is reduced when threads in a thread group perform ray tracing operations. Consequently, the techniques described herein are more efficient than prior art ray tracing techniques. For example, in an implementation where each thread is initially assigned a different ray to process, as the threads complete tracing their assigned rays, the threads assist with tracing the rays assigned to other threads until tracing the set of assigned rays completes. Similarly, in an implementation where each thread is initially assigned a different segment of the same ray to process, as the threads complete tracing their assigned segments, the threads assist with tracing other unprocessed segments in the ray until all segments of the ray have been traced. As a result, the time that threads spend idle, not performing any ray tracing work, is reduced, thereby reducing the overall time needed to perform ray tracing operations on a given image.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for tracing a ray within a parallel processor, the method comprising:
   receiving, at a first thread of the parallel processor, at least a portion of a first ray for tracing;

identifying a first node within an acceleration structure associated with the at least a portion of the ray, wherein the first node is associated with a volume of space traversed by the ray;

identifying a plurality of nodes that comprise child nodes of the first node;

selecting a second node of the plurality of nodes for processing by the first thread;

selecting a third node of the plurality of nodes for processing by a second thread of the parallel processor;

determining that the second thread is currently processing at least a portion of a second ray;

in response to the determining that the second thread is currently processing the at least the portion of the second ray, placing an entry associated with the third node into a first data structure; and causing the second thread to retrieve the entry associated with the third node from the first data structure when the second thread has completed processing the at least the portion of the second ray.

2. The method of claim 1, wherein the first data structure comprises a stack that is local to the first thread.

3. The method of claim 2, further comprising:

selecting a fourth node of the plurality of nodes for processing;

determining that a number of threads are currently available to process the fourth node; and placing an entry associated with the fourth node into a second data structure;

wherein the second data structure comprises a pooled work buffer that is shared among a plurality of threads comprising the first thread and the second thread.

4. The method of claim 1, wherein the first data structure comprises a pooled work buffer that is shared among a plurality of threads comprising the first thread and the second thread.

5. The method of claim 4, further comprising:

selecting a fourth node of the plurality of nodes for processing;

determining that the first data structure lacks sufficient space to store an entry associated with the fourth node; and placing an entry associated with the fourth node into a second data structure;

wherein the second data structure is a stack that is local to the first thread.

6. The method of claim 1, further comprising:

determining that at least one thread in a plurality of threads comprising the first thread and the second thread has discovered a ray segment that intersects a graphics object between a first point and a second point; and causing each thread in the plurality of threads to terminate execution.

7. The method of claim 1, further comprising:

retrieving a first value from a storage location that represents a first intersection point at which the at least a portion of the ray intersects a first graphics object;

determining that a ray segment intersects a second graphics object at a second intersection point;

determining that the second intersection point is closer to a surface plane than the first intersection point; and causing a second value that represents the second intersection point to be stored in the storage location.

8. The method of claim 1, further comprising:

determining that a first ray segment intersects a graphics object at an intersection point;

determining that a third thread of the parallel processor is processing a fourth node that corresponds to a second ray segment, wherein the second ray segment is more distant from a surface plane than the intersection point; and causing the third thread to terminate execution.

9. The method of claim 8, further comprising causing the third thread to receive a fifth node that corresponds to a third ray segment for processing, wherein the third ray segment is closer to the surface plane than the intersection point.

10. A non-transitory computer-readable storage medium including instructions that, when executed by a processing unit, cause the processing unit to trace a ray within a parallel processor, by performing the steps of:

receiving, at a first thread of the parallel processor, at least a portion of a first ray for tracing;

identifying a first node within an acceleration structure associated with the at least a portion of the ray, wherein the first node is associated with a volume of space traversed by the ray;

identifying a plurality of nodes that comprise child nodes of the first node, wherein each node within the plurality of nodes is associated with a different sub-volume of space within the volume of space, and wherein each sub-volume of space is associated with a corresponding ray segment within the at least a portion of the ray;

determining that two or more nodes within the plurality of nodes are associated with sub-volumes of space that intersect the at least a portion of the ray;

selecting a second node that comprises one node of the two or more nodes for processing by the first thread;

selecting a third node that comprises another node of the two or more nodes for processing by a second thread of the parallel processor;

determining that the second thread is currently processing at least a portion of a second ray;

in response to the determining that the second thread is currently processing the at least the portion of the second ray, placing an entry associated with the third node into a first data structure; and causing the second thread to retrieve the entry associated with the third node from the first data structure when the second thread has completed processing the at least the portion of the second ray.

11. The non-transitory computer-readable storage medium of claim 10, wherein the first data structure comprises a stack that is local to the first thread.

12. The non-transitory computer-readable storage medium of claim 11, wherein the processor is further configured to perform the steps of:

selecting a fourth node that comprises yet another node of the two or more nodes for processing;

determining that a number of threads are currently available to process the fourth node; and placing an entry associated with the fourth node into a second data structure;

wherein the second data structure comprises a pooled work buffer that is shared among a plurality of threads comprising the first thread and the second thread.

13. The non-transitory computer-readable storage medium of claim 10, wherein the first data structure comprises a pooled work buffer that is shared among a plurality of threads comprising the first thread and the second thread.

14. The non-transitory computer-readable storage medium of claim 13, wherein the processor is further configured to perform the steps of:
- selecting a fourth node that comprises yet another node of the two or more nodes for processing;
- determining that the first data structure lacks sufficient space to store an entry associated with the fourth node; and
- placing an entry associated with the fourth node into a second data structure;
- wherein the second data structure is a stack that is local to the first thread.

15. The non-transitory computer-readable storage medium of claim 10, wherein the processor is further configured to perform the steps of:
- determining that at least one thread in a plurality of threads comprising the first thread and the second thread has discovered a ray segment that intersects a graphics object between a first point and a second point; and
- causing each thread in the plurality of threads to terminate execution.

16. The non-transitory computer-readable storage medium of claim 10, wherein the processor is further configured to perform the steps of:
- retrieving a first value from a storage location that represents a first intersection point at which the at least a portion of the ray intersects a first graphics object;
- determining that a ray segment intersects a second graphics object at a second intersection point;
- determining that the second intersection point is closer to a surface plane than the first intersection point; and
- causing a second value that represents the second intersection point to be stored in the storage location.

17. The non-transitory computer-readable storage medium of claim 10, wherein the processor is further configured to perform the steps of:
- determining that a first ray segment intersects a graphics object at an intersection point;
- determining that a third thread of the parallel processor is processing a fourth node that corresponds to a second ray segment, wherein the second ray segment is more distant from a surface plane than the intersection point; and
- causing the third thread to terminate execution.

18. The non-transitory computer-readable storage medium of claim 17, wherein the processor is further configured to perform the step of causing the third thread to receive a fifth node that corresponds to a third ray segment for processing, wherein the third ray segment is closer to the surface plane than the intersection point.

19. A system, comprising:
- a processor; and
- a memory containing instructions, that, when executed by the processor, cause the processor to trace a ray within a parallel processor, by:
  - receiving, at a first thread of the parallel processor, at least a portion of a first ray for tracing;
  - identifying a first node within an acceleration structure associated with the at least a portion of the ray, wherein the first node is associated with a volume of space traversed by the ray;
  - identifying a plurality of nodes that comprise child nodes of the first node;
  - selecting a second node of the plurality of nodes for processing by the first thread;
  - selecting a third node of the plurality of nodes for processing by a second thread of the parallel processor;
  - determining that the second thread is currently processing at least a portion of a second ray;
  - in response to the determining that the second thread is currently processing the at least the portion of the second ray, placing an entry associated with the third node into a first data structure; and
  - causing the second thread to retrieve the entry associated with the third node from the first data structure when the second thread has completed processing the at least the portion of the second ray.

20. The system of claim 19, wherein the first data structure comprises a stack that is local to the first thread.

* * * * *